PULSE GENERATOR

Original Filed Dec. 14, 1964 Sheet 1 of 2

INVENTOR
FRANK J. HORLANDER

BY [signatures]
ATTORNEYS

PULSE GENERATOR

Original Filed Dec. 14, 1964

INVENTOR

FRANK J. HORLANDER

BY [signatures]

ATTORNEYS

United States Patent Office 3,454,792

Patented July 8, 1969

3,454,792

PULSE GENERATOR

Frank J. Horlander, Lexington, Ky., assignor, by mesne assignments, to the United States of America as represented by the Secretary of the Navy Original application Dec. 14, 1964, Ser. No. 418,361, now Patent No. 3,304,504, dated Feb. 14, 1967. Divided and this application Jan. 9, 1967, Ser. No. 608,223
Int. Cl. H03k 5/08
U.S. Cl. 307—261 1 Claim

ABSTRACT OF THE DISCLOSURE

A pulse generator for generating a pair of pulse trains which are 180° out of phase having a clipping circuit whose output is connected in series to a stretching circuit and to a shaper circuit and to a differentiator circuit. The differentiator circuit means is connected to a pulse forming network which produces positive pulses and to a pulse forming network which produces negative pulses.

This is a division of application Ser. No. 418,361, filed Dec. 14, 1964 and now U.S. Patent 3,304,504.

The present disclosure relates to a pulse generator and more particularly to a pulse generator which converts sine wave energy into two symmetrically located pulse trains.

Generally it has been found desirable to provide a pulse generator for generating a pair of pulse trains having the pulses of the first pulse train 180° out of phase with the pulses of the second pulse train.

Very briefly the present pulse generator converts the positive portion of a sine wave into a pair of pulse trains which are 180° out of phase with each other by first clipping the incoming positive portion of the sine wave, stretching the clipped positive portion to obtain appropriate spacing between the eventually produced differentiated pulses and then shaping the stretched wave. The shaped pulse is then differentiated. The positive portion of the differentiated pulse is utilized to drive a pulse forming network which produces a first train of pulses and the negative portion of the differentiated pulse is utilized to drive another pulse forming network which produces a second train of pulses which are 180° out of phase with the first train of pulses and medially interspeced in time between the first series of pulses.

An object of the present invention is to provide a pulse generator for simultaneously generating a pair of pulse trains that are medially interspaced in time.

Another object of the present invention is to provide a pulse generator for generating a pair of trains that are 180° out of phase with each other.

Figures 1, 3:
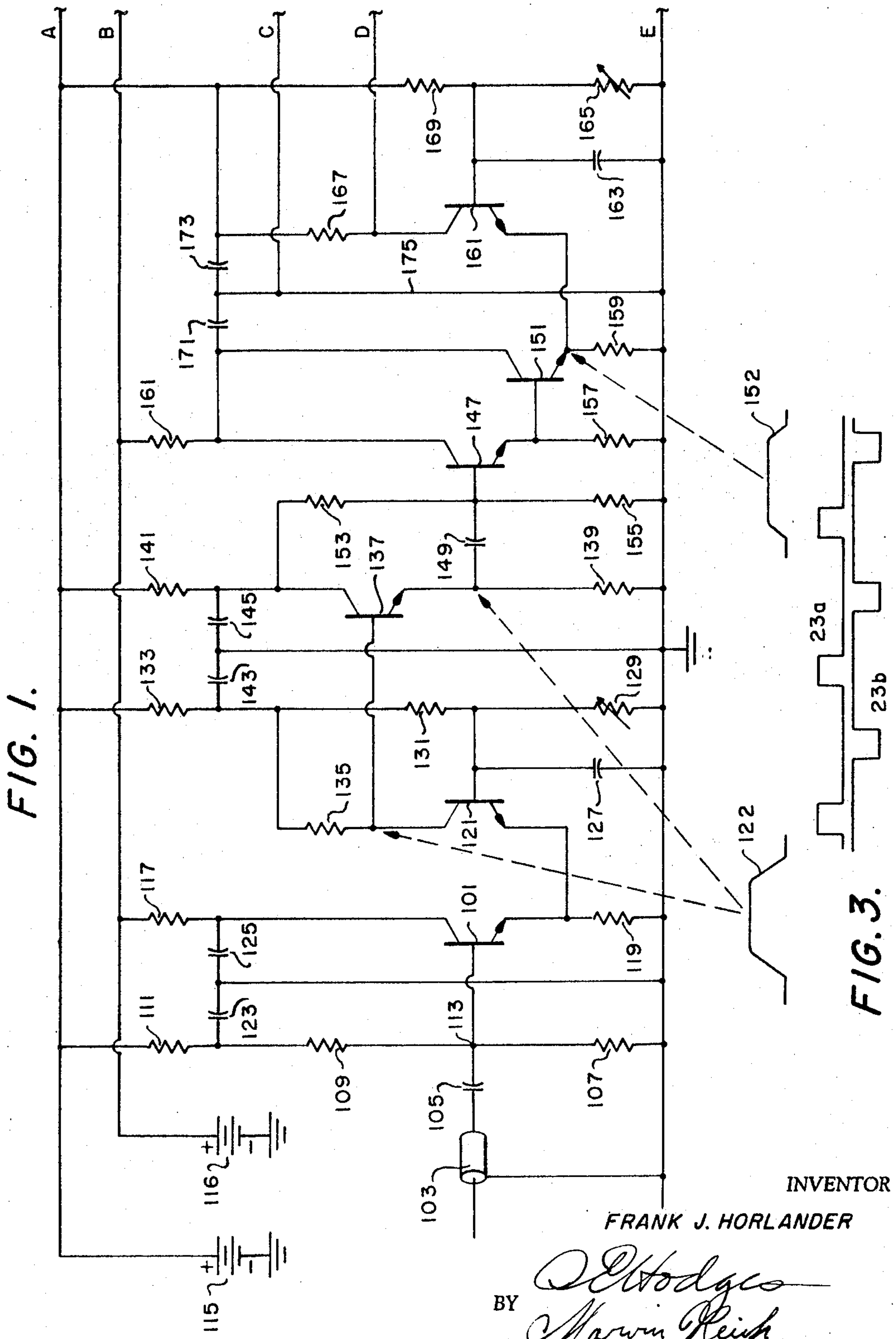
Figure 2:
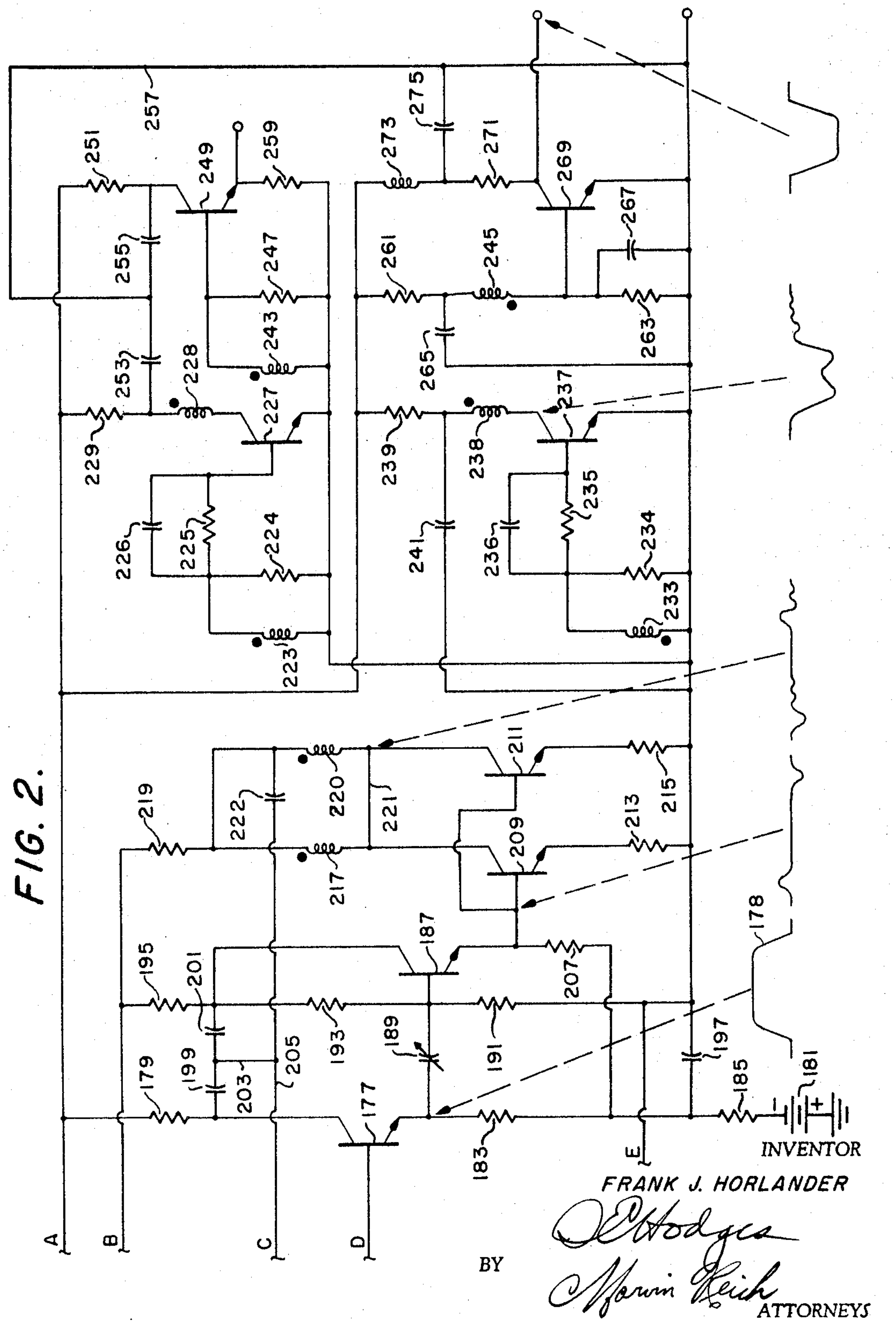

Other objects and many of the attendant advantages of this invention will be readily appreciated as the same becomes better understood by reference to the following detailed description when considered in connection with the accompanying drawings wherein:

FIGS. 1 and 2 taken together illustrate a circuit diagram for a pulse generator in accordance with the invention;

FIG. 3 shows the relationship of the pulse trains generated by the pulse generator.

Referring to FIGS. 1 and 2 which when taken together illustrate a pulse generator constructed in accordance with a preferred embodiment of this invention.

The disclosed pulse generator uses the same type of NPN transistor throughout the circuit. The pulse generator comprises a transistor 101 having its base connected to the input terminal 103 through a capacitor 105. Resistors 107, 109, 111 are connected in series. Resistor 107 being connected between the terminal 113 and ground and resistors 109 and 111 being connected in series between the terminal 113 and a 16 volt positive voltage supply 115. The collector of transistor 101 is connected to an 8 volt positive supply 116 through resistor 117 and the emitter of transistor 101 is connected both to ground through resistor 119 and to the emitter of transistor 121. Capacitors 123 and 125 are connected in series between resistors 109 and 111 and resistor 117 and the collector of transistor 101. The capacitors are grounded by a lead connected therebetween.

The base of transistor 121 is connected to ground through the parallel circuit of capacitor 127 and variable resistor 129. Resistor 129 is series connected to supply 115 through resistors 131 and 133 and resistor 135 is connected between the collector of transistor 121 and series resistors 133 and 131. The collector of transistor 121 is also connected to the base of transistor 137 which has its emitter connected to ground through resistor 139 and its collector connected to supply 115 through resistor 141. Capacitors 143 and 145 in series are connected between resistors 131 and 135 and the collector of transistor 137, the capacitors being connected to ground through a lead connected therebetween.

The emitter of transistor 137 is also connected to the base of transistor 147 through capacitor 149, the emitter of transistor 147 in turn being connected to the base of transistor 151. A resistor 153 is connected between capacitor 149 and resistor 141 and another resistor 155 is connected between ground and the base of transistor 147.

The emitters of transistor 147 and 151 are connected to ground through resistors 157 and 159 respectively, while the collectors are connected to the 8 volt supply 116 through resistor 161. The emitter of transistor 151 is connected to the emitter of transistor 161 which has its base connected to ground through a capacitor 163 and a variable resistor 165 connected in parallel and has its collector connected to supply 115 through resistor 167. A resistor 169 is connected between resistor 165 and supply 115 and series capacitors 171 and 173 are connected between the supply 115 and the collector of transistor 151, the capacitors being grounded by a lead 175 connected therebetween.

FIG. 2 is a continuation of the circuitry of FIG. 1 in which the respective lines A, B, C, D and E of FIG. 1 are connected to the lines A, B, C, D and E of FIG. 2. FIG. 2 shows the collector of transistor 161 connected to the base of transistor 177 which has its collector connected to supply 115 through resistor 179 and its emitter negatively biased by supply 181 through resistors 183 and 185. The emitter of transistor 177 is also connected to the base of transistor 187 through a variable capacitor 189, the capacitor being connected to ground through a resistor 191 whereby the capacitor and resistor function as a differentiator network. Transistor 187 has its base connected to the supply 116 through resistors 193 and 195 and its collector connected to the 8 volt supply through resistor 195. A capacitor 197 is connected between resistor 183 and 185 and ground and capacitors 199 and 201 in series are connected between the collector of transistor 177 and resistor 179 and resistors 193 and 195. A lead 203 is connected between capacitors 199 and 201 and a lead 205 which in turn is connected to ground through lead 175.

Transistor 187 has its emitter connected to supply 181 through resistors 207 and 185 and also connected to the bases of transistors 209 and 211. The emitters of transistors 209 and 211 are connected to ground through resistors 213 and 215 respectively while the collectors are connected to the supply 116 through primary winding 217 and resistor 219 and primary winding 220 and resistor 219 respectively. Primary winding 217 couples the signal to secondary winding 223 poled in the same direction, while primary winding 220 couples the signal to secondary winding 233 poled in the opposite direction. A lead 221 is connected between the collectors of transistors 209 and 211, and a capacitor 222 has one plate connected to lead 205 and the other plate connected between winding 220 and resistor 219.

The secondary windings 223 and 233 are connected in parallel with resistors 224 and 234 respectively and each parallel network has one terminal grounded and the other terminal connected in series with parallel networks comprising a resistor 225 and capacitor 226 and a resistor 235 and capacitor 236, respectively. The resistor-capacitor parallel networks 225, 226 and 235, 236 are respectively connected to the bases of transistors 227 and 237. The emitter of each transistor is grounded and the respective collectors are connected to supply 115 through primary winding 228 and resistor 229 and primary winding 238 and resistor 239. A capacitor 241 has one plate connected to ground and the other plate connected between winding 238 and resistor 239.

Primary winding 228 couples the signal to secondary winding 243 which is poled in the same direction and primary winding 238 couples the signal to secondary winding 245 which is poled in the opposite direction. A resistor 247 is connected in parallel with winding 243 and the parallel network has one terminal grounded and the other terminal connected to the base of output transistor 249. The collector of transistor 249 is connected to supply 115 through resistor 251 and is also connected to one plate of capacitor 255. Capacitors 253 and 255 are connected in series with one plate of capacitor 253 connected to the junction of winding 228 and resistor 229. A lead 257 connects capacitors 253 and 255 to ground. A resistor 259 is connected between the emitter of transistor 249 and ground and the output of transistor 249 is taken from the emitter.

The secondary winding 245 is connected to supply 115 through resistor 261 and is connected to ground through resistor 263. Capacitors 265 and 267, each having one plate grounded have the other plate connected between winding 245 and resistor 261, and winding 245 and resistor 263 respectively. The output transistor 269 has its base connected between winding 245 and resistor 263 and has its collector connected to supply 115 through a resistor 271 and inductor 273. A capacitor 275 having one plate connected between resistor 271 and inductor 273 has its other plate connected to ground. The transistor 269 has its emitter connected to ground and the output of the transistor is taken from the collector.

The pulse generator converts sine wave energy into two pulse trains which provide accurate time interval control for the system. A sine wave is fed into the initial stage at the left of FIG. 1 and the positive half of the wave is clipped, stretched and shaped by the seven transistor stages preceding the differentiator network, capacitor 189 and resistor 191, as shown by the waveforms appearing below the schematic diagram. This processing is needed to provide the desired rectangular waveform.

Specifically the sine wave is coupled to the base of the transistor 101. The positive portion of the sine wave biases the transistor 101 to cause it to become conductive thereby causing the transistor 121 to become nonconductive by differential action which places a positive blocking potential on the emitter of transistor 121. Cutting off transistor 121 produces pulse 122. When transistor 121 becomes nonconductive the voltage on its collector becomes more positive which in turn raises the positive potential on the base of transistor 137 to cause it to become conductive. This causes the emitter of transistor 137 to becomes positive, as shown by pulse 122. The positive pulse from transistor 137, shown as pulse 122, is coupled to the base of transistor 147 by capacitor 149 causing the transistor 147 to become conductive. When the transistor 147 becomes conductive its emitter acquires a positive voltage thereon which is applied to the base of transistor 151 to cause it to become conductive. When the transistor 151 becomes conductive it develops a positive pulse on its emitter electrode, as shown by the pulse 152. Comparison of pulses 122 and 152 indicates the subsequent stretching through interstage RC coupling of the clipped sine wave produced on the collector of transistor 121. The positive pulse appearing on the emitter of transistor 161 causes it to cut off. When the transistor 161 cuts off its collector goes positive placing a positive pulse on the base of transistor 177 causing the transistor 177 to become conductive. When transistor 177 becomes conductive its emitter has a positive output pulse as shown by pulse 178.

The output of transistor 187 is in the form of alternating positive and negative pulses. These pulses are applied to the bases of both NPN transistors 209 and 211 which act as signal-following inverters as indicated by the waveforms shown in FIG. 2.

The output of transistor 209 passed to a primary winding 217 which coacts with a secondary 223 to provide a first or upper pulse output path.

Similarly, the output of transistor 211 is coupled via primary winding 220 to secondary 233 for defining a second or lower pulse output path.

In the path of winding 223, the NPN transistor 227 is normally cut off and is driven to conduction by the positive going fluctuations. NPN transistor 227 amplifies these signals. The amplified pulses which are negative going are fed via the primary 228 and its secondary 243 to the base of NPN transistor 249. When the pulses become positive going, the transistor 249 is driven to conduction and provides positive output pulses (see the positive pulse train 23*a* of FIG. 3) on the emitter of the transistor.

Meanwhile, in the second pulse output path, the NPN transistor 237 receives at its base, pulses displaced 180° in phase from those appearing on primary winding 220. The positive going pulses, as in the first path, drive the transistor 237 to conduction and the output is in the form of negative going amplified pulses displaced 180° in phase from those pulses in the upper path. The output of transistor 237 is coupled via the primary 238 and secondary 245 to the base electrode of transistor 269. When the pulses, as in the first path, become positive going, the transistor 269 is driven to conduction and provides negative output pulses (see the negative pulse train 236 of FIG. 3) on the collector of the transistor. The negative output pulse is produced because the collector of transistor 269 is originally biased to B+ by the supply 115 and the conduction of the transistor opens a path to ground causing the voltage on the collector to drop. This drop in voltage while the transistor is conducting appears as a negative output pulse on the collector of the transistor 269.

Thus, it is seen that in the upper path having input secondary 223, the transformer couplings and transistor components act together in the proper phase relations to produce a positive output pulse on the emitter of the transistor 249 which is 180° phase displaced from the negative output pulse in the lower path produced by means of transformer couplings and transistor components and finally appearing on the collector of the transistor 269. The pulse generator thereby converts sine wave energy into positive and negative pulse trains of narrow rectangular pulses displaced 180° in phase for accurate time interval control.

By way of example a pulse generator of the type illustrated in FIGS. 1 and 2 may be provided with circuit components having the following approximate values:

Voltage supplies:
- 115—+16 volts
- 116—+8 volts
- 181—−8 volts

Resistors:
- 111, 117, 133, 141, 161, 179, 185, 195, 219 229, 239, 251, 271—470 ohms
- 107—1.2 kilohms
- 109—2.7 kilohms
- 119—200 ohms
- 129, 165—0–500 ohms
- 131, 169—820 ohms
- 139, 157, 207—680 ohms
- 153—10 kilohms
- 115—7.5 ohms
- 159—68 ohms
- 167, 225, 235, 259—220 ohms
- 191, 193, 224, 234, 247—470 ohms
- 213, 215—150 ohms
- 261—1.5 kilohms
- 263—1.8 kilohms Capacitors:
- 105—.005 farad
- 123, 125, 127, 143, 145, 163, 171, 173, 197, 199, 201, 222, 241, 253, 255, 265, 275—0.1 farad
- 149—470 pf.
- 189—3–12 pf.
- 226, 236—82 pf.
- 267—56 pf.

Inductor: 273—100 μh.

Transistors: 101, 121, 147, 151, 161, 177, 187, 209, 211, 227, 237, 249, 269—2N834

These circuit values are illustrative only and constitute no limitation of the present invention.

Obviously many modifications and variations of the present invention are possible in the light of the above teachings. It is therefore to be understood that within the scope of the appended claim the invention may be practiced otherwise than as specifically described.

What is claimed is:

1. A pulse generator for producing from an oscillatory input wave first and second independent pulse trains of opposite polarity and equal spacing between successive positive and negative pulses comprising:

input network means responsive to the input wave for clipping the input wave;

differentiator network means coupled to the input network means for producing alternate positive and negative pulses in accordance with the rise and fall points of the clipped input wave;

first and second output path means connected to said differentiator network means to receive the output thereof, said first and second path means comprising a bias voltage supply;

a ground terminal;

first transformer means in said first path means having a primary and a secondary wound in the same direction for coupling the signal in the same sense;

transistor means having an input electrode and an output electrode providing a negative going output signal in response to a positive going input signal;

means including RC circuit means coupling said secondary of said first transformer means to said input electrode of said transistor means;

second transformer means having a primary and a secondary wound in the same direction;

the primary of said second transformer means being connected to the output electrode of said transistor means;

output transistor means having a base, a collector and an emitter, said base being connected to said secondary of said second transformer means, said collector being connected to said bias voltage, and said emitter being connected to an output terminal, whereby a positive going signal input to the base causes said output transistor means to become conductive and provide on the output terminal a positive pulse;

third transformer means in said second path means having a primary and a secondary wound in the opposite direction for coupling the signal in the opposite sense, thereby providing a signal on the secondary which is displaced 180° in phase from the signal on said secondary in said first path;

transistor means having an input electrode and an output electrode providing a negative going output signal in response to a positive going input signal;

means including RC circuit means coupling said secondary of said third transformer means to said input electrode of said transistor means;

fourth transformer means having a primary and a secondary wound in the opposite direction, said primary of said fourth transformer means being connected to the output electrode of said transistor means; and output transistor means having a base, a collector and an emitter, said base being connected to said secondary of said fourth transformer means, said emitter being connected to said ground terminal, and said collector being connected to said bias voltage and to an output terminal, whereby a positive going signal to the base causes said output transistor means to become conductive and provide on the output terminal a negative pulse which is displaced 180° in phase from the positive pulse on the output terminal in said first path.

References Cited

UNITED STATES PATENTS

| | | | |
|---|---|---|---|
| 2,399,135 | 4/1946 | Miller et al. | 328—28 XR |
| 2,559,666 | 7/1951 | Schooley | 328—36 XR |
| 3,002,152 | 9/1961 | Yeaton et al. | 328—62 |
| 3,258,611 | 6/1966 | Candilis | 307—268 XR |
| 3,268,818 | 8/1966 | Cole et al. | 328—29 XR |

JOHN S. HEYMAN, *Primary Examiner.*

JOHN ZAZWORSKY, *Assistant Examiner.*

U.S. Cl. X.R.

307—262, 268; 328—62